No. 629,634. Patented July 25, 1899.
J. WEST.
APPARATUS FOR SHAPING AND BEVELING EDGES OF GLASS LENSES.
(Application filed Jan. 16, 1899.)
(No Model.) 3 Sheets—Sheet 1.
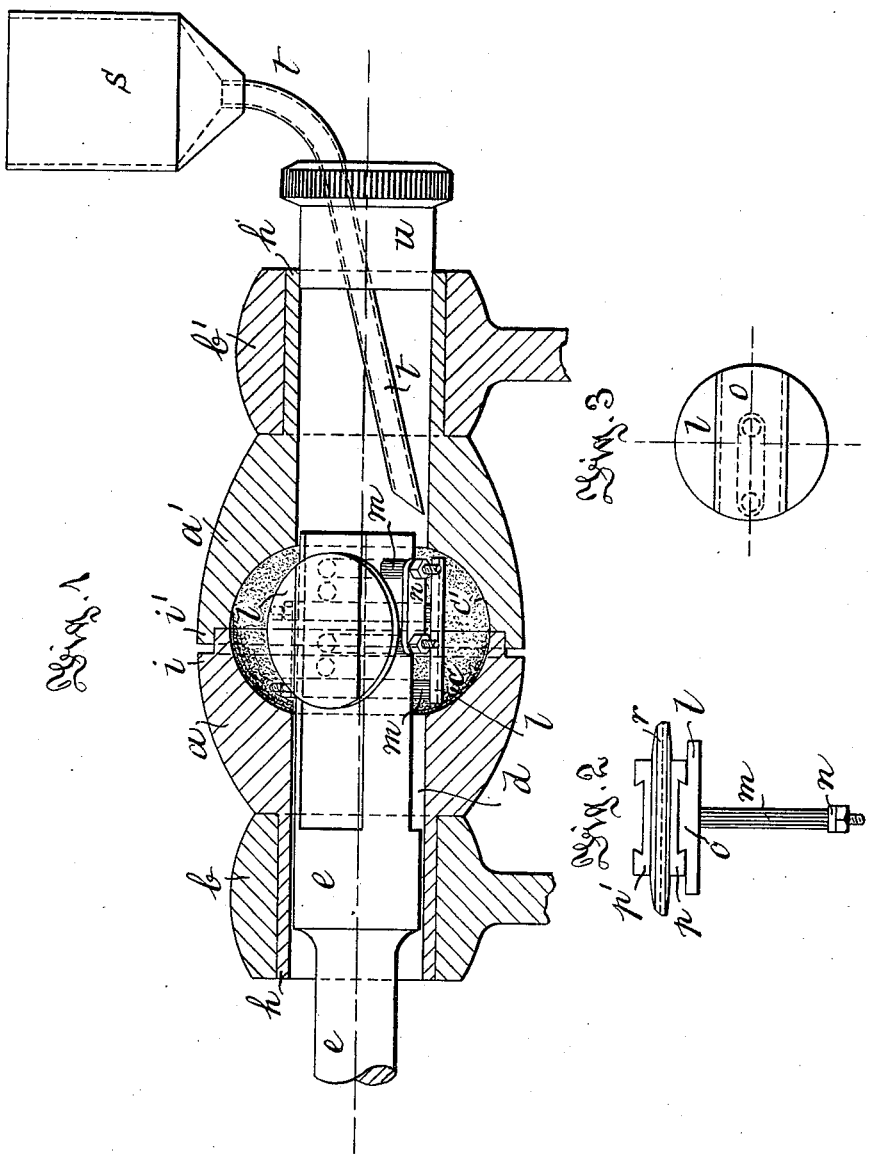

No. 629,634. Patented July 25, 1899.
J. WEST.
APPARATUS FOR SHAPING AND BEVELING EDGES OF GLASS LENSES.
(Application filed Jan. 16, 1899.)
(No Model.) 3 Sheets—Sheet 2.
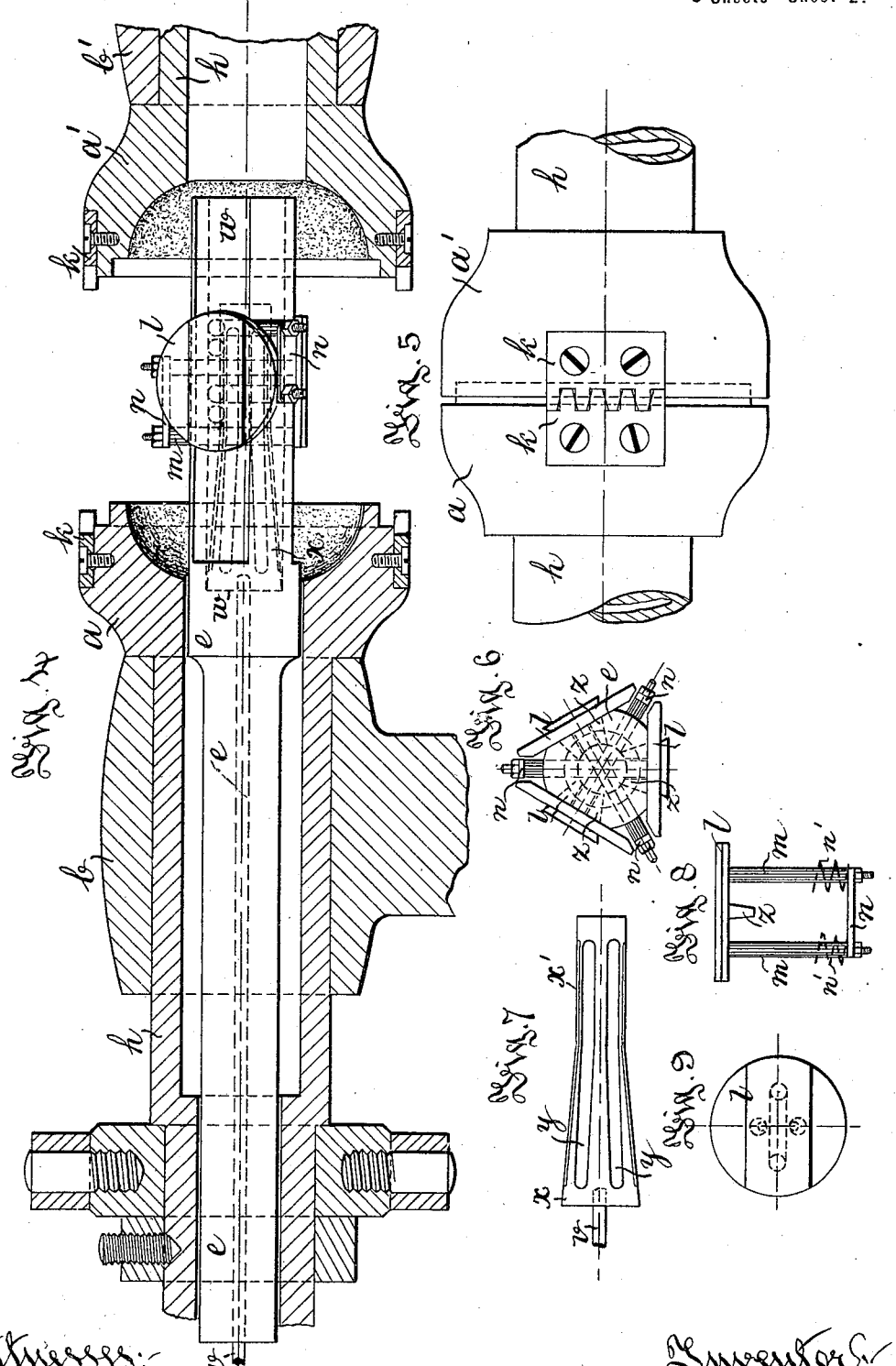

No. 629,634. Patented July 25, 1899.
J. WEST.
APPARATUS FOR SHAPING AND BEVELING EDGES OF GLASS LENSES.
(Application filed Jan. 16, 1899.)
(No Model.) 3 Sheets—Sheet 3.
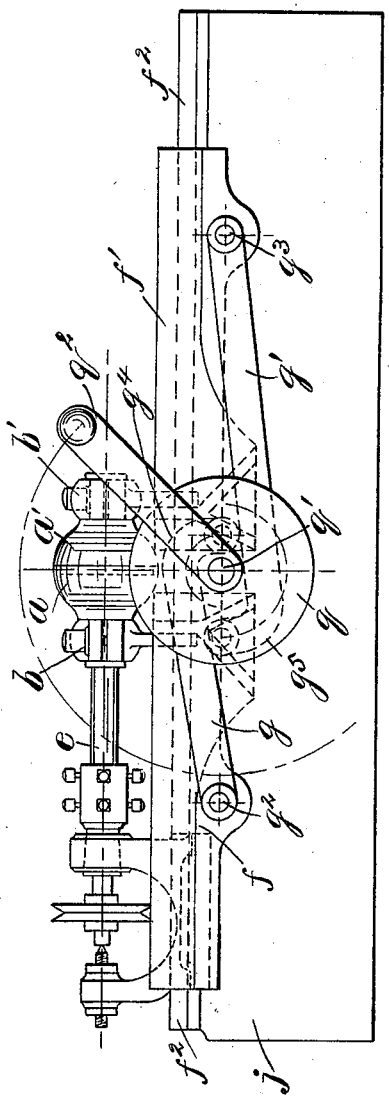
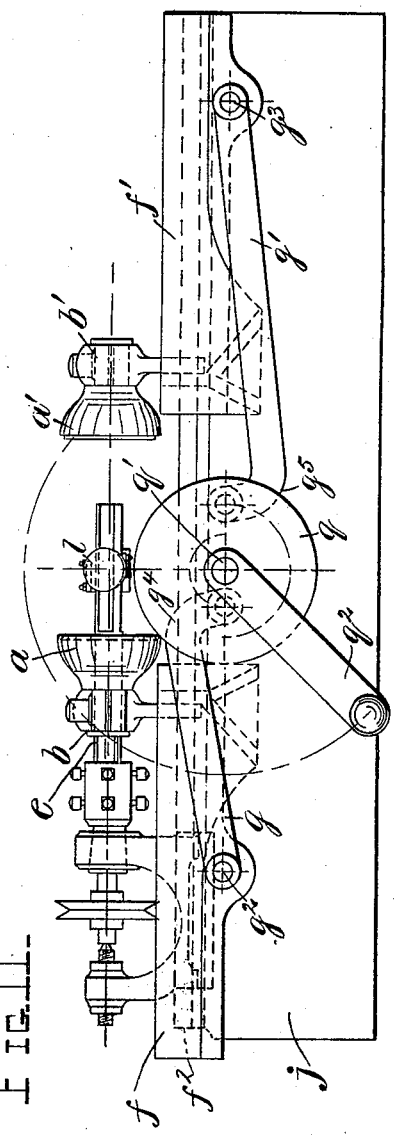
Witnesses
Clarence A. Bateman
John H. Hall
Inventor
James West
by Wilkinson & Fisher
Attorneys
THE NORRIS PETERS CO., PHOTO-LITHO., WASHINGTON, D. C.

UNITED STATES PATENT OFFICE.

JAMES WEST, OF LONDON, ENGLAND.

APPARATUS FOR SHAPING AND BEVELING EDGES OF GLASS LENSES.

SPECIFICATION forming part of Letters Patent No. 629,634, dated July 25, 1899.

Application filed January 16, 1899. Serial No. 702,291. (No model.)

*To all whom it may concern:*

Be it known that I, JAMES WEST, manufacturer, a subject of the Queen of Great Britain, residing at Dalston, London, in the county of Middlesex, England, have invented certain new and useful Improvements in Apparatus for Shaping and Beveling the Edges of Glass Lenses; and I do hereby declare the following to be a full, clear, and exact description of the invention, such as will enable others skilled in the art to which it appertains to make and use the same.

My invention relates to improvements in apparatus for shaping elliptical or other glass lenses and beveling their edges; and the objects of my improvements are, first, to provide a hollow mold of the exact shape required to grind the lenses to the required shape and to bevel their edges; second, to provide means for readily fixing and revolving the lenses in the proper positions within the mold, and, third, to provide means for feeding the lenses against the grinding-surface of the mold until they have acquired the desired shape and dimensions. I attain these objects by the mechanism illustrated in the accompanying drawings, in which—

Figure 1 is a longitudinal vertical section through apparatus in which the lenses to be ground are kept pressed against the interior of the grinding-mold by centrifugal force. Fig. 2 is a side view, and Fig. 3 a top view, of one of the cradles or "dops" shown separately. Fig. 4 is a longitudinal vertical section through apparatus in which the lenses to be ground are kept pressed against the interior of the mold by a feeding device, the grinding-mold being shown open. Fig. 5 is a top view of the grinding-mold shown closed. Fig. 6 is an end view of three cradles or dops to hold three lenses arranged symmetrically around a driving-spindle. Fig. 7 is a side view of the device for feeding the lenses against the interior of the grinding-mold. Fig. 8 is a different side view, and Fig. 9 a top view, of a cradle or dop shown separately. Fig. 10 represents my improved apparatus in side elevation showing means for adjusting the grinding-molds and showing the latter in their closed position; and Fig. 11 represents the same, showing the grinding-molds separated.

Similar letters refer to similar parts throughout the several views.

$a\ a'$ is the hollow grinding-mold, made in two pieces, which are firmly carried in brackets $b\ b'$, which can be brought together to close the mold, as shown in Fig. 1, or separated sufficiently to open the mold, as shown in Fig. 4, the brackets $b\ b'$ being firmly bolted to a support when the mold has been closed.

$c\ c'$ are hemispherical recesses in the two halves of the mold.

$d$ is an axial opening, through which passes a spindle $e$, which can be set in rapid revolution by a pulley at its outer end. This spindle $e$ turns in bearings (not shown in the drawings) at its outer end and is guided freely in the cylindrical extensions $h$ of the mold $a\ a'$, by which the latter are held.

Each half of the mold is carried in brackets $b\ b'$, as above described, and these brackets are rigidly secured to the base-plates $f f'$, which slide on guides $f^2$, carried by the base or bed $j$. To the base-plates are secured the arms $g$ and $g'$, respectively, being pivoted, as at $g^2$ and $g^3$. The inner ends of these arms are bent, as at $g^4$ and $g^5$, where they are pivoted to a disk $q$, mounted on a spindle $q'$. An arm $q^2$ is secured to the spindle $q'$, so that by it the disk may be rotated in either direction. It will be readily seen that by rotating the disk $q$ in one direction the arms $g$ and $g'$ cause the molds $a$ and $a'$ to separate and by turning it in the opposite direction brings them together.

The edge $i$ of one of the halves of the mold $a$ is recessed into the edge $i'$ of the other half $a'$, so that their inner surface when they are brought together is smooth and continuous.

$k$, Fig. 4, represents toothed plates screwed to the edges, by which they are securely guided and held in place.

The end of the spindle or mandrel $e$ has three equidistant flats formed upon its sides, as shown in Figs. 1, 4, and 6, and against each of these flat sides is fitted a disk $l$, which carries the lens which is to be ground. Each of these disks has firmly fixed to its back two parallel pins or bars $m$, which pass freely through corresponding holes in the flat sides of the spindle, the pins upon one of the disks being arranged at equal distances at each side of the center and those upon the other two disks being arranged nearer to the edge of the disk, so that the pins and the holes through the spindle may not interfere with each other, as indicated in Fig. 1. The outer ends of the pins $m$ after passing through the spindle $e$ are connected by a cross-bar $n$, Figs. 1, 2, 4, 6, and 8, and light helical springs (shown in dotted lines at $n'$, Fig. 8) may be arranged around the pins between the spindle $e$ and the cross-bar $n$, so as to draw the disks $l$ against the flat sides of the spindle. In Figs. 1, 4, 6, and 8 the pins are shown fluted, being made of pinion steel, so as to enable debris to pass away freely.

The cradles or dops on which the lenses are carried are shown clearly in Figs. 2 and 3. The disks $l$ have upon their outer surface a transverse dovetailed guide $o$, upon which fits freely a corresponding plate $p$, provided with guides fitting upon the guide $o$, so that it can move freely upon the latter. The lens $r$, Fig. 2, is fixed by pitch or other cement upon the outer face of the plate $p$, and a similar plate $p'$ is similarly cemented to the other or outer side of the lens $r$, so that when the edge upon one side of the latter has been shaped and beveled it can be reversed to bevel the edge on the other side, the plate $p'$ being fitted upon the dovetailed guide $o$.

In Fig. 1, $s$ is a reservoir containing emery or other suitable abrasive powder, which is fed, together with oil, turpentine, or other suitable liquid, into the interior of the mold $a\ a'$ through a pipe $t$. It is shown held in place by a stopper $u$, inserted into the end of the part $a'$ of the mold.

The interior of the mold $a\ a'$ is carefully shaped so that when the two halves are brought together, as shown in Fig. 1, the recesses in them exactly coincide and form a spheroidal chamber or mold, so that if the said chamber be cut through that zone in the periphery where it is intended to give the shape and beveling to the edge of the lenses or glasses by a plane parallel to the axis the section would be an ellipse the axes of which would coincide with those of the lenses which it is desired to produce.

The three lenses or glasses roughly shaped having been fixed to the cradles, as already described, and being carried around by the rapidly-rotating mandrel $e$ are urged outward by the centrifugal force of the cradles against the internal surface or walls of the mold during the grinding process.

During the process of grinding the mold is rigidly held, while only the mandrel $e$ and its attachments with the lenses are rotated.

If on account of the lenses being too small or for any other reason the centrifugal force is not sufficient to force them out against the interior grinding-surface of the mold, I use the device shown in Figs. 4, 6, and 7. The spindle $e$ has a central longitudinal passage through which passes the bar $v$, and the outer end of the spindle $e$, at the part where its sides are flattened, is bored so as to form a cylindrical chamber $w$. At the end of the bar $v$ is formed or fixed a cone $x$, Fig. 7, the outer part of which at $x'$ is cylindrical, while the larger end of the cone $x$ fits freely in the chamber $w$. The cone and cylinder $x\ x'$ are perforated transversely with longitudinal slots $y$, through which the pins $m$ at the back of the plates $l$ can pass freely. Projections $z$ at the back of the plates $l$ rest against the parts of $x\ x'$ between the slots $y$, so that if the conical part $x$ is pressed in by means of the bar $v$ the plates $l$, together with the cradles or dops and the lenses, will be mechanically forced gradually outward and the edges of the lenses will be ground and beveled in the manner already described. When the bar $v$ is withdrawn, the cradles and lenses can revert to their positions adjoining the spindle.

The interior of the mold $a\ a'$ may be varied in shape, so as to grind and bevel the edges of lenses or glasses of other than elliptical shape. If, for example, the edges of circular glasses or lenses are to be beveled, the mold $a\ a'$ will be made of spherical shape internally. It will be understood, therefore, that lenses or glasses of a great variety of shapes may be shaped and beveled by my invention.

The bevel required on the edges of all spectacle glasses or lenses is more or less of a V shape in cross-section, which is continuous around the entire edge. By the arrangement described, the shaping and beveling are first effected over the edge of one side of the lens, and it is then only necessary to reverse the lens by fitting the plate $p'$ into the dovetail guide $o$ in order to bevel the edge of the opposite side.

The edges of glass for mirrors and other purposes may be beveled by means of my invention.

The bar $v$ is forced gradually in when required by means of a screw pressing against its ends or by equivalent means, as will be readily understood by mechanics.

I am aware that prior to my invention lenses have been shaped and beveled by grinding apparatus, and I do not claim such apparatus generally; but

What I claim as my invention, and desire to secure by Letters Patent, is—

1. The combination, in apparatus for shaping and beveling the edges of lenses, of a hollow mold in two parts $a$, $a'$, held in adjustable brackets $b$, $b'$ and having transverse passage $d$, central spindle $e$, lens-holding plates $l$ carried by pins $m$ passing freely through spindle $e$, and means for revolving the spindle $e$, substantially as set forth.

2. The lens-cradle, consisting of the plate $l$, pins $m$, dovetailed guide $o$, and plate $p$, substantially as shown, for the purpose specified.

3. The combination, in apparatus for shaping and beveling the edges of lenses, of the hollow mold in two parts $a$, $a'$, held in adjustable brackets $b$, $b'$ and having the transverse passage $d$, spindle $e$, plates $l$, $p$, pins $m$, reservoir $s$, conducting-pipe $t$ and plug $u$, all substantially as set forth.

4. The combination, in apparatus for shaping and beveling the edges of lenses, of the hollow mold in two parts $a$, $a'$, held in adjustable brackets $b$, $b'$ and having the transverse passage $d$, hollow spindle $e$, plates $l$, pins $m$, chamber $w$, central bar $v$, cone $x$, and cylinder $x'$, transverse slots $y$, and projections $z$, and means for feeding forward the central bar $v$, all substantially as set forth, for the purpose specified.

5. The combination with the spindle $e$, plates $l$ carrying-pins $m$ passing freely through transverse holes in the spindle $e$, of cross-bars $n$ at the ends of the pins, and springs $n'$ between the cross-bars $n$ and the spindle $e$, substantially as shown, for the purpose specified.

In testimony whereof I have hereunto affixed my signature in presence of two witnesses.

JAMES WEST.

Witnesses:
W. C. SYKES,
EDMUND EDWARDS.